United States Patent
Winterfeld et al.

(10) Patent No.: US 11,934,685 B2
(45) Date of Patent: Mar. 19, 2024

(54) PERFORMING MEMORY ACCESS OPERATIONS BASED ON QUAD-LEVEL CELL TO SINGLE-LEVEL CELL MAPPING TABLE

(71) Applicant: MICRON TECHNOLOGY, INC., Boise, ID (US)

(72) Inventors: Michael Winterfeld, Firestone, CO (US); Guanying Wu, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 82 days.

(21) Appl. No.: 17/578,341

(22) Filed: Jan. 18, 2022

(65) Prior Publication Data

US 2023/0229340 A1 Jul. 20, 2023

(51) Int. Cl.
*G06F 3/06* (2006.01)
*G06F 12/06* (2006.01)
*G06F 12/02* (2006.01)

(52) U.S. Cl.
CPC .......... *G06F 3/0655* (2013.01); *G06F 3/0604* (2013.01); *G06F 3/0673* (2013.01); *G06F 12/06* (2013.01)

(58) Field of Classification Search
CPC .... G06F 3/0655; G06F 3/0604; G06F 3/0673; G06F 12/06
USPC ........................................................ 711/154
See application file for complete search history.

(56) References Cited

U.S. PATENT DOCUMENTS

| | | | |
|---|---|---|---|
| 10,109,361 B1* | 10/2018 | Khakifirooz | G11C 16/3481 |
| 11,693,771 B2* | 7/2023 | Ji | G06F 12/0246 |
| | | | 711/103 |
| 2007/0150645 A1* | 6/2007 | Chandramouli | G06F 12/0246 |
| | | | 714/E11.138 |
| 2014/0013333 A1* | 1/2014 | Mishaeli | G06F 9/445 |
| | | | 718/108 |
| 2019/0102102 A1* | 4/2019 | Natarajan | G06F 3/0613 |
| 2020/0042223 A1* | 2/2020 | Li | G06F 12/0802 |
| 2020/0118636 A1* | 4/2020 | Athreya | G06F 3/0659 |
| 2020/0379905 A1* | 12/2020 | Ji | G06F 12/0292 |
| 2021/0064289 A1* | 3/2021 | Kanno | G06F 3/064 |
| 2021/0151098 A1* | 5/2021 | Natarajan | G11C 11/5642 |
| 2021/0200436 A1* | 7/2021 | Ish | G06F 3/0659 |

* cited by examiner

*Primary Examiner* — Arpan P. Savla
*Assistant Examiner* — Sidney Li
(74) *Attorney, Agent, or Firm* — Lowenstein Sandler LLP

(57) ABSTRACT

A quad-to-single (Q2S) data structure comprising a plurality of the Q2S mapping entries is maintained on a volatile memory device. Each Q2S mapping entry, identified by a physical address of a quad-level cell (QLC) block stripe of a non-volatile memory device, comprises a bit flag and a pointer to a linked list on the volatile memory device. Responsive to programming at least one single-level cell (SLC) block stripe of a plurality of SLC block stripes of the non-volatile memory device with data to be programmed to a QLC block stripe, an entry for an identification of the QLC block stripe to be programmed and an entry for each physical address of the at least one SLC block stripe of the plurality of SLC block stripes programmed with data to be programmed to the QLC block stripe is appended to a linked list. The linked list corresponds to a Q2S mapping entry associated with the QLC block stripe to be programmed.

20 Claims, 7 Drawing Sheets

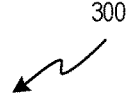

Maintain a quad-to-single (Q2S) data structure comprising a plurality of Q2S mapping entries, wherein each Q2S mapping entry, identified by a physical address of a quad-level cell (QLC) block stripe of a non-volatile memory device, comprises a bit flag and a pointer to a linked list. 310

Responsive to programming at least one single-level cell (SLC) block stripe of a plurality of SLC block stripes of the non-volatile memory device with data to be programmed to a QLC block stripe, append to a linked list, linked to a Q2S mapping entry associated with the QLC block stripe to be programmed, an entry for an identification of the QLC block stripe to be programmed and an entry for each physical address of the at least one SLC block stripe of the plurality of SLC block stripes programmed with data to be programmed to the QLC block stripe. 320

FIG. 3

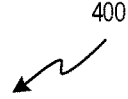

Program at least one single-level cell (SLC) block stripe of a plurality of SLC block stripes of a non-volatile memory device with data to be programmed to a quad-level cell (QLC) block stripe of the non-volatile memory device, wherein the plurality of SLC block stripes are associated with the QLC block stripe. 410

Identify an entry of a quad-to-single (Q2S) mapping table based on the QLC block stripe to be programmed, wherein each entry of the Q2S bitmap comprises a pointer to a linked list and a bit flag. 420

Set a bit flag of the entry of the Q2S mapping table indicating that the QLC block stripe to be programmed is not programmed. 430

Update the pointer of the entry of the Q2S mapping table to point to a linked list, wherein the linked list includes a first entry comprising an identification of the QLC block stripe to be programmed and an entry for each logical address of the plurality of SLC block stripes programmed with the data to be programmed to the QLC block stripe. 440

Copy the data of the plurality of programmed SLC block stripes to the QLC block stripe to be programmed. 450

PERFORMING MEMORY ACCESS OPERATIONS BASED ON QUAD-LEVEL CELL TO SINGLE-LEVEL CELL MAPPING TABLE

TECHNICAL FIELD

Embodiments of the disclosure relate generally to memory sub-systems, and more specifically, relate to performing memory access operation based on quad-level cell to single-level cell mapping table.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method of performing memory access operation based on the Q2S mapping table, in accordance with some embodiments of the present disclosure.

FIG. 4 is a flow diagram of an example method of performing memory access operation based on the Q2S mapping table, in accordance with some embodiments of the present disclosure.

DETAILED DESCRIPTION

Figure 1:
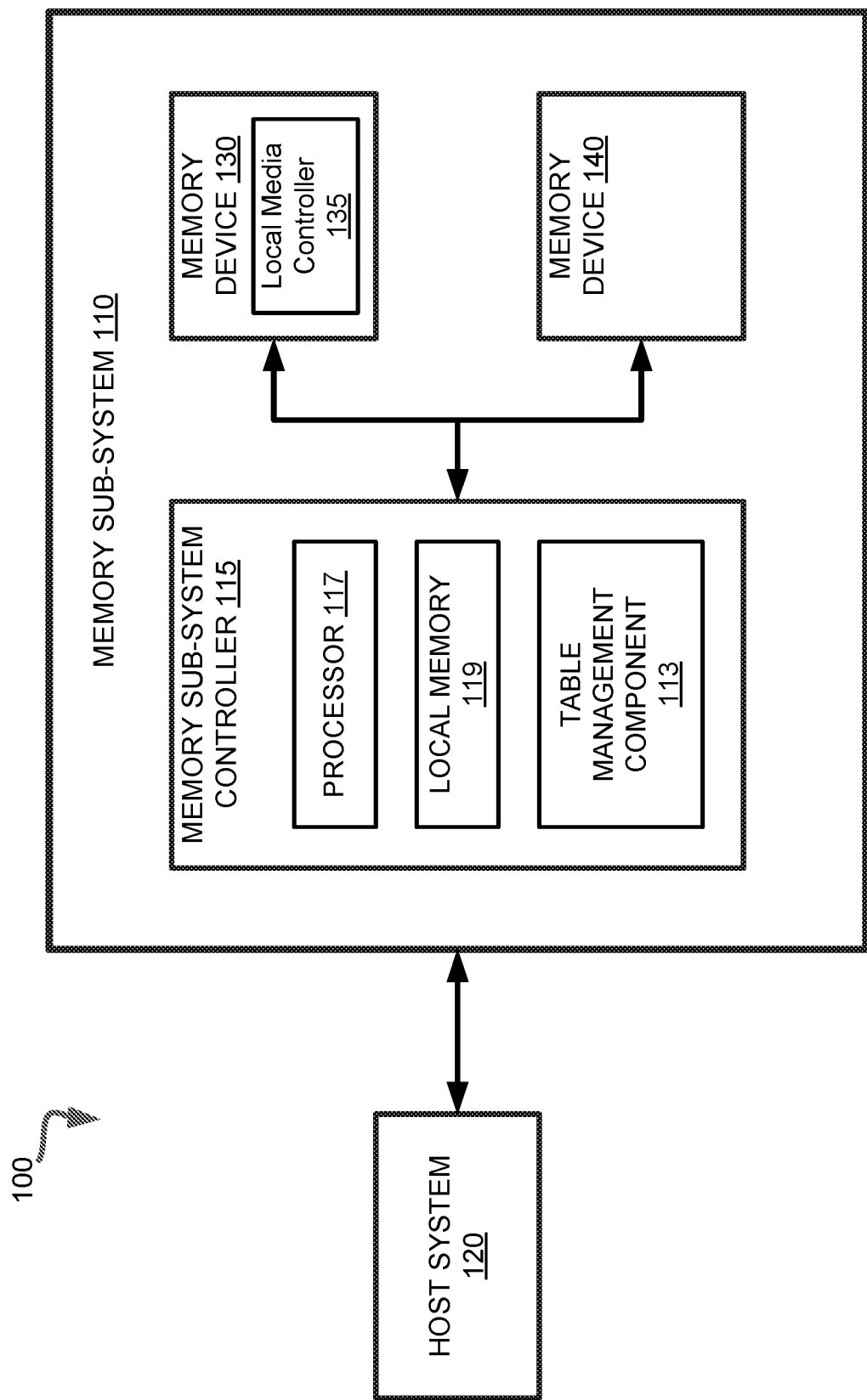
FIG. 1 illustrates an example computing system that includes a memory sub-system, in accordance with some embodiments of the present disclosure.

Aspects of the present disclosure are directed to performing memory access operation based on a quad-level cell to single-level cell (Q2S) mapping table. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e. in stripes). Accordingly, one request to read a segment of data (e.g., corresponding to one or more data addresses), can result in read operations performed on two or more of the memory planes of the memory device.

Some memory devices use certain types of memory cells, such as quad-level cell (QLC) memory cells, which store four bits of data in each memory cell, which make it affordable to move more applications from legacy hard disk drives to newer memory sub-systems, such as NAND solid-state drives (SSDs). QLC memory is particularly well-tuned for read-intensive workloads, often seen in data center applications where data is normally generated once, and then read regularly to perform calculations and analysis.

Certain memory sub-systems implementing QLC memory use a standard 16-16 coarse-fine, two-pass programming algorithm. Since a QLC memory cell stores four bits of data, there are 16 possible programming levels (i.e., $2^4$) representing the possible values of those four bits of data. Programming a wordline begins by coarsely programming all 16 levels in a first pass. The objective, of this "coarse," first pass is to program all cells rapidly to slightly below their final target programming levels. During the slower, "fine," second pass, the memory cells are programmed to a slightly higher final target programmed voltage. Such two-pass programming minimizes cell to cell (C2C) interference, as every cell and its neighbors are nearly at their final target programmed voltage when the fine programming pass is performed, and need only be "touched-up." The combination of not requiring precision programming in the first pass, and the minimized C2C coupling, leads to fast programming with high read window budget (RWB). Such standard 16-16 coarse-fine programming, however, requires all data to be first written to single-level cell (SLC) memory (i.e., memory cells storing one bit of data per cell) before the first pass to protect against asynchronous power loss (APL).

During a coarse state of the QLC cells (e.g., after the coarse programming pass of the QLC cell), the data stored in the QLC cells are unreadable. Some memory sub-systems store a copy of the coarse data stored in the QLC (e.g., the data programmed during the coarse state) into a volatile memory device (e.g., dynamic random access memory (DRAM)) until the data can be finely programmed into the QLC cells (e.g., performing the fine programming pass on the QLC cells). Accordingly, the coarse data stored in the QLC cells that otherwise would not have been readable can be read from a separate location (e.g., the volatile memory device). Typically, coarse data copied to the volatile memory devices (e.g., DRAM) can be made up of hundreds of megabytes (MBs). Thus the coarse data is required to be written (e.g., flushed) to single-level cell (SLC) memory (i.e., memory cells storing one bit of data per cell) before the first pass to protect against asynchronous power loss (APL).

Other memory sub-systems utilize the SLC as a cache to initially (e.g., prior to a coarse programming pass of the QLC) program the SLC with the data to be written to the QLC. Accordingly, the data is immediately readable from the SLC. Thereafter, the data may be moved from the SLC cache to other memory, such as QLC memory for longer-term storage (e.g., coarse and fine programming pass). The data can be moved using a copyback operation, e.g., using a cache register. To read data from the SLC cache until the fine programming of the QLC, a logical-to-physical (L2P) mapping data structure (e.g., L2P mapping table) is maintained. The L2P mapping table maintains, for a number of logical addresses, a one-to-one mapping to respective physical addresses (e.g., a physical location of the SLC and/or QLC). Accordingly, prior to coarse programming of the QLC, the L2P mapping table will include the physical address of the SLC cache storing the data to be written to the QLC. Once the QLC is finely programmed, the L2P mapping table is updated to replace the physical address of the SLC cache with the physical address of the QLC. In some instances, the L2P mapping table stores both the physical address of the SLC and the physical address of the QLC until the QLC is finely programmed, and then the physical address of the SLC is removed. Thus, the L2P mapping table is constantly updated with fine programming of the QLC, which leads to increased write amplification and performance degradation with respect to reads.

Aspects of the present disclosure address the above and other deficiencies by maintaining a mapping of the SLC cache to the QLC (e.g., quad-to-single (Q2S) mapping table) while the data is undergoing copyback to facilitate the reading of the data from the SLC cache until fine programming of the QLC (e.g., copyback). In one embodiment, the memory sub-system maintains a data structure (e.g., the Q2S mapping table) comprising a plurality of entries, each identified by QLCs (e.g., a physical address of the QLCs). Each entry of the plurality of entries of the data structure comprises a bit flag, and a pointer to a linked list of physical addresses for each of the SLCs linked to the QLC (e.g., four SLCs fit into a single QLC). Once the QLC is allocated and the SLCs are allocated, the bit flag is set to indicate that the QLC is not fully programmed (e.g., copyback has not begun or is in progress), and the pointer is updated to point to the linked list of the four SLCs associated with the QLC. Based on an allocation of the QLC, the memory sub-system updates the L2P table with the physical address of the QLC rather than the physical address of each SLC associated with the QLC and, in some instances, the physical address of the QLC. Once the data is written to the QLC (e.g., copyback is performed and completed), the bit flag is reset (e.g., cleared) to indicate that the QLC is fully programmed and the linked list is cleared (e.g., the logical address of each SLC associated with the QLC is removed from the linked list). In some embodiments, rather than clearing the linked list, the pointer is cleared (e.g., set to null).

Accordingly, upon receiving a memory access operation (e.g., read operation) directed to a logical address associated with a physical address of the QLC, the memory sub-system queries the Q2S mapping table to determine whether the QLC is fully programmed based on the bit flag. If the bit flag is set (e.g., indicating that the QLC is not fully programmed), the memory sub-system retrieves from the linked list a physical address of an SLC associated with the QLC to return to the memory sub-system rather than the physical address of the QLC to perform the memory access operation. In some embodiments, the memory sub-system determines which physical address of the SLC from the physical addresses of the SLCs linked to the QLC based on a page number of the physical address of the QLC. If the bit flag is not set (e.g., indicating that the QLC is fully programmed), the memory sub-system returns to the memory sub-system the physical address of the QLC to perform the memory access operation.

Advantages of the present disclosure include, but are not limited to, limiting the number of updates performed on the L2P mapping table, reducing performance degradation due to reads directed to SLC, and limiting APL reconstruction due to the L2P mapping table solely containing logical addresses of QLC.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a table management component 113 that can maintain a quad-level cell to single-level cell (Q2S) data structure (e.g., Q2S mapping table) in the volatile memory device (e.g., memory device 140). Each entry of the Q2S mapping table is indexed (e.g., identified) by an allocated quad-level cell block stripe (QLC) in the non-volatile memory device (e.g., memory device 130). Each entry of the Q2S mapping table stores a bit flag and a pointer to a linked list configured to store a physical address of each allocated single-level cell block stripe (SLC) associated with the allocated QLC. As noted above, each allocated SLC (e.g., 4 SLCs that fits into a single QLC) is utilized as a cache to initially program the data to be written to the corresponding allocated QLC in preparation for a copyback operation (e.g., reading data from the allocated SLCs and programming the data to the corresponding allocated QLC using two-pass programming). Depending on the embodiment, the QLC may be a multi-level cell (MLC) block stripe, a triple-level cell (TLC) block stripe, a penta-level cell (PLC) block stripe, or any multitude of level cell block stripe (e.g., desired level block stripe). Thus, the number of SLC may be adjusted to comply with the multitude of the level block stripe (i.e., any suitable number of SLCs to fit into the desired level block stripe). Accordingly, the Q2S mapping table, linked list, and other components may be adjusted in a suitable manner to effectuate the mapping of the desired level block stripe to an SLC.

The table management component 113, responsive to the allocation of the allocated QLC, updates a logical-to-physical (L2P) data structure (e.g., L2P mapping table) with a physical address of the allocated QLC to facilitate translation of a logical representation of a portion of the memory device to a physical address of the memory device. The physical address of the memory device may be represented by a data structure containing Die, block, page, plane, and TU associated with the physical address of the memory device.

The bit flag can be set to a first logical state (e.g., to the logical "1") to indicate that the corresponding allocated QLC is not programmed (e.g., the copyback operation has not been completed or that both passes of the two-pass programming have not been completed) and the bit flag can be set to a second logical state (e.g., to the logical "0") to indicate that the corresponding allocated QLC is programmed (e.g., the copyback operation has been completed or that both passes of the two-pass programming have been completed).

Responsive to the allocation of the allocated SLC for programming of the data to be programmed to the corresponding allocated QLC, table management component 113 sets the bit flag to indicate that the QLC is not programmed. Accordingly, a header node is appended to the linked list to store an identification of the corresponding allocated QLC associated with the index of the entry of the Q2S mapping table. The linked list is further populated with each sequential programming of the allocated SLCs associated with data to be written to the corresponding allocated QLC. Accordingly, once an SLC of the allocated SLCs is programmed with data to be written to the corresponding allocated QLC, a node is appended to the linked list storing a physical address of the programmed allocated SLC of the allocated SLCs.

The table management component 113, responsive to the programming of at least one SLC of the allocated SLCs, sets the bit flag of the Q2S mapping table to indicate that the corresponding allocated QLC is not programmed. Copyback operation may be initiated after the first SLC of the allocated SLCs is programmed with the data to be written to the corresponding allocated QLC. In some embodiments, the copyback operation may be initiated after all the allocated SLCs are programmed with the data to be written to the corresponding allocated QLC. The bit flag of the Q2S mapping table is cleared once the copyback operation is completed, indicating that the corresponding allocated QLC is programmed due to all the data stored in the allocated SLCs being read from the allocated SLCs and programmed using two-pass programming to the corresponding allocated QLC.

Responsive to completion of the copyback operation (e.g., the QLC is programmed), the table management component 113 clears the bit flag to indicate that the QLC is programmed. In some embodiments, the table management component 113 may clear the pointer to the linked list. In some embodiments, the table management component 113 may clear the pointer to the linked list and erase or overwrite the information stored in each node of the linked list. In some embodiments, the table management component 113 may erase or overwrite the information stored in each node of the linked list.

Responsive to receiving a request from the host system 120 to perform a memory access operation (e.g., read operation) on a logical address of memory device 130, the table management component 113 performs an L2P mapping table lookup to translate the logical address to a physical address of the memory device (e.g., to a physical address of a QLC). Depending on the embodiment, the L2P mapping table may contain various logical addresses associated with a single physical address of the memory device. Upon translation of the logical address to the physical address of the QLC, the table management component 113 queries the Q2S mapping table to identify an entry of the Q2S mapping table associated with the physical address of the QLC by matching an index of the Q2S with the physical address of the QLC.

Once an entry of the Q2S corresponding to an index that matches the physical address of the QLC is identified, the table management component 113 determines whether the QLC is programmed based on the bit flag of the entry of the Q2S. If the bit flag is cleared or not set, indicating that the QLC is programmed, the table management component 113 returns the physical address of the QLC to the host system 120 to perform the memory access operation. If the big flag is set indicating that the QLC is not programmed, the table management component 113 accesses the linked list associated with the entry of the Q2S corresponding to the physical address of the QLC by using the pointer to the linked list. Accordingly, the table management component 113 may traverse the linked list associated with the entry of the Q2S corresponding to the physical address of the QLC to determine which physical address of the SLCs associated with the QLC to return to the host system 120. To determine which physical address of the SLCs associated with the QLC to return to the host system 120, the table management component 113 identifies a page number of the physical address of the QLC and, based on the page number of the physical address of the QLC determines which physical address of the SLCs to return to the host system 120.

For example, each SLC contains a page number between 0-699 (e.g., 700 pages), and each QLC contains a page number between 0-2799 (e.g., 2800 pages). Thus, since each programmed SLC is sequentially appended to the linked list, a first SLC of the SLCs having a page number between 0-699 corresponds to a first portion of the QLC having a page number between 0-699, a second SLC of the SLCs having a page number between 0-699 corresponds to a second portion of the QLC having a page number between 700-1399, a third SLC of the SLCs having a page number between 0-699 corresponds to a third portion of the QLC having a page number between 1400-2099, and a fourth SLC of the SLCs having a page number between 0-699 corresponds to a fourth portion of the QLC having a page number between 2100-2799. Accordingly, based on the page number of the physical address of the QLC (e.g., 825), the table management component 113 can determine that the physical address of the second SLC in the linked list should be returned to the host system 120 instead of the physical address of the QLC since the QLC is not programmed. Further details with regards to the operations of the table management component 113 are described below.

In some embodiments, the memory sub-system controller 115 includes at least a portion of the table management component 113. In some embodiments, the table management component 113 is part of the host system 110, an application, or an operating system. In other embodiments, local media controller 135 includes at least a portion of table management component 113 and is configured to perform the functionality described herein.

Figure 2A:
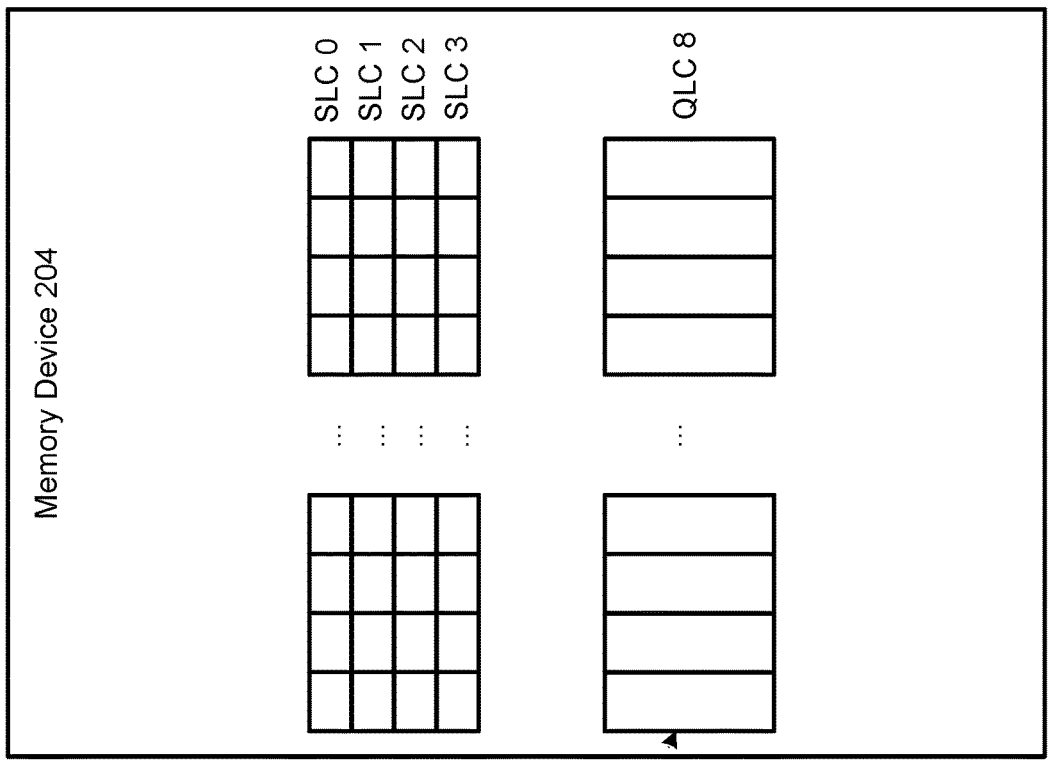
FIG. 2A-2C illustrates performing memory access operation based on quad-level cell to single-level cell (Q2S) mapping table, in accordance with some embodiments of the present disclosure.
Figure 2B:
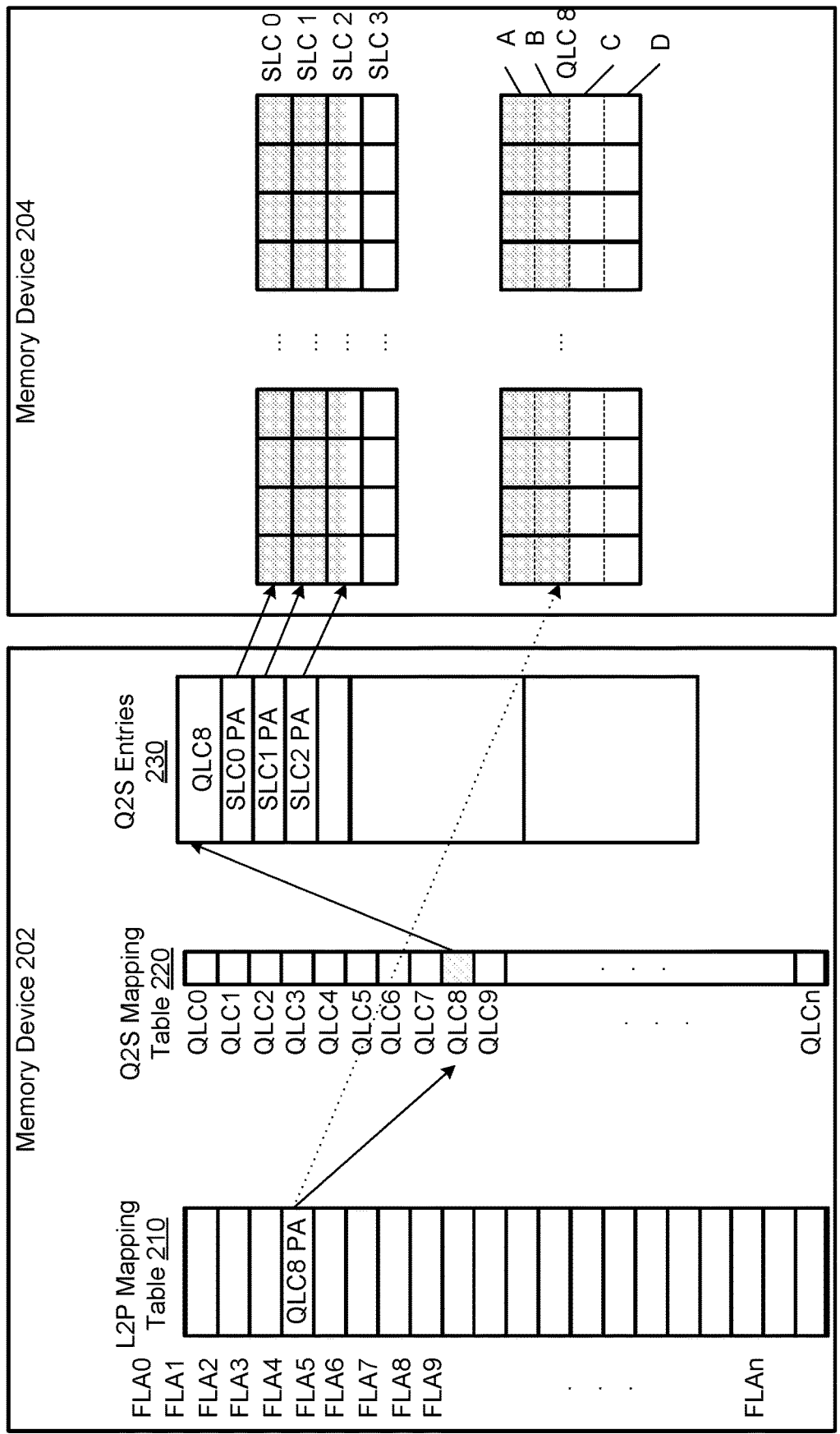
Figure 2C:
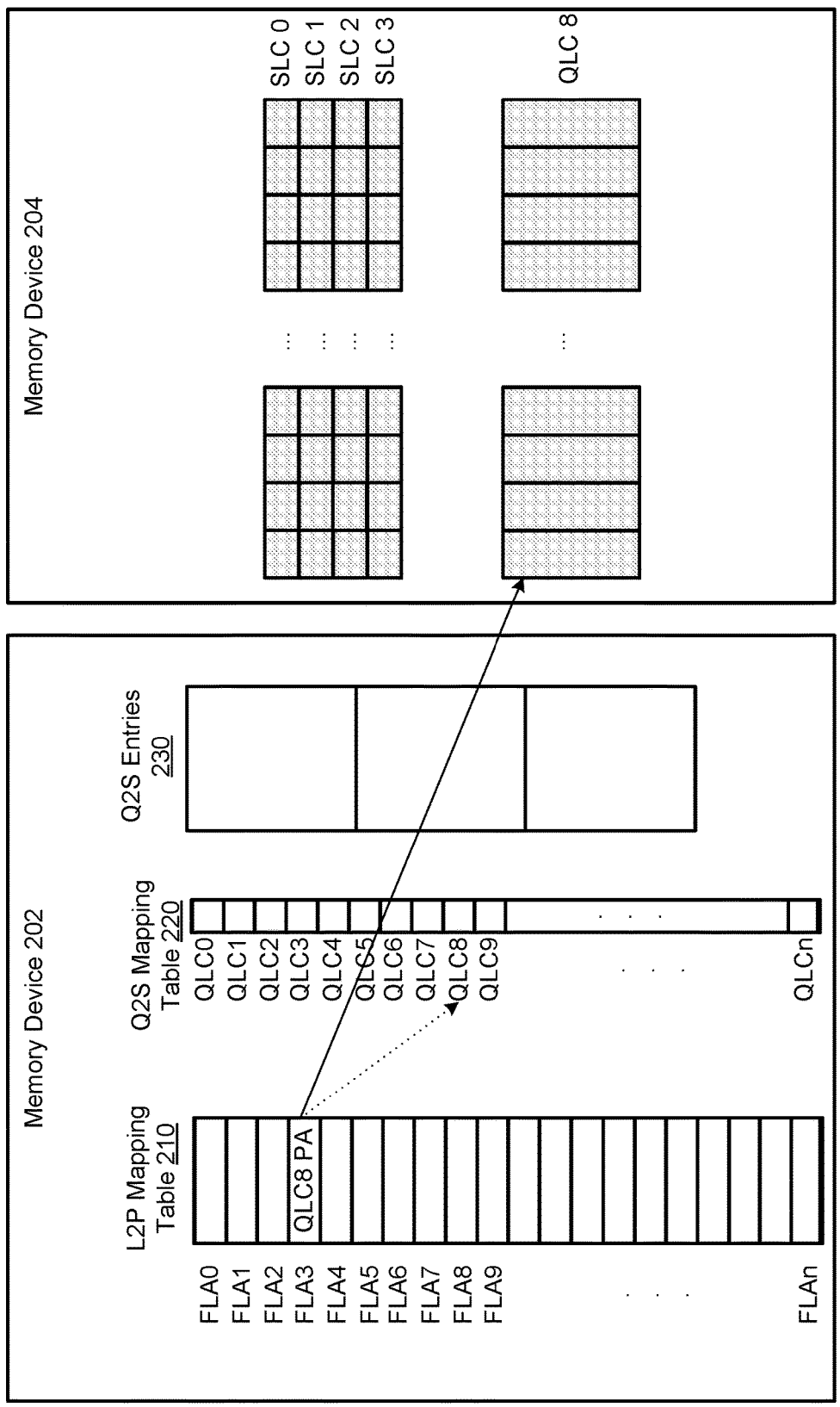

FIG. 2A-2C are block diagrams illustrating performing memory access operation based on Q2S mapping table in volatile memory device 202 and to access data in non-volatile memory device 204. Memory devices 202 and 204 can represent either memory devices 130 and/or 140. Referring to FIG. 2A, the memory device 202 maintains an L2P mapping table 210 wherein each entry is configured to contain a physical address of the memory device 204 associated with a flash logical address (FLA) (e.g., FLA0-n) or logical address. Once a quad-level cell block stripe (QLC) (e.g., QLC8) is allocated, the L2P mapping table 210 is updated with the physical address (PA) of the allocated QLC (e.g., QLC8 PA) directed to QLC8 in memory device 204. Based on the allocation of QLC8, a plurality of SLCs (SLC0-3) are allocated in memory device 204 to assist with the programming of QLC8 (e.g., copyback operation). Referring now to FIG. 2B, once the SLC0-3 and QLC8 are allocated in memory device 204, a Q2S mapping table 220 may be maintained in memory device 202 indexed by the physical address contained in the L2P mapping table 210. In particular, the Q2S mapping table indexed by the allocated QLCs (e.g., QLC0-n) and contains a bit flag to indicate whether the allocated QLC is programmed or not and a pointer to a linked list (e.g., Q2S entries 230) of physical addresses associated with each of the SLC0-3 that is programmed.

As previously described, the bit flag is set (e.g., to the logical "1") to indicate that the allocated QLC is not programmed (e.g., the copyback operation has not been completed or that both passes of the two-pass programming have not been completed), and the bit flag is cleared or reset (e.g., to the logical "0") to indicate that the corresponding allocated QLC is programmed (e.g., the copyback operation has been completed or that both passes of the two-pass programming have been completed). Initially, since QLC8 is not programmed, the bit flag of the Q2S mapping table associated with QLC8 is set.

As the SLC0-3 of memory device 204 is being programmed with data to be programmed to QLC8, a header node is initially appended to Q2S entries 230 containing an identification of the QLC8. As each of the SLC0-3 is programmed, an additional node is appended to Q2S entries 230 containing a physical address of the programmed SLC or SLC being programmed. For example, a node is appended to Q2S entries 230 comprising SLC0 PA directed to the SLC0 in the memory device 204 when SLC0 is being programmed, a node is appended to Q2S entries 230 comprising SLC1 PA directed to the SLC1 in the memory device 204 when SLC1 is being programmed, and a node is appended to Q2S entries 230 comprising SLC2 PA directed to the SLC2 in the memory device 204 when SLC2 is being programmed. In particular, the SLC is not required to be fully programmed prior to creating a node comprising the physical address and appending to Q2S entries 230 (e.g., SLC2).

Once the first SLC is programmed (e.g., fully programmed), for example, SLC0 in memory device 204, the copyback operation is initiated to begin reading data from each the plurality of SLCs (SLC0-3) that is programmed to perform two-pass programming of the data to QLC8. Accordingly, the data of SLC0 in memory device 204 is read from SLC0 and programmed using two-pass programming to a first portion A of QLC8 in memory device 204. Once the programming of the first portion A of QLC8 is complete, the data of SLC1 in memory device 204 is read from SLC1 and programmed using two-pass programming to a second portion B of QLC8 in memory device 204 and so on. In some instances, for example, the data of SLC2 in memory device 204 is not programmed (e.g., fully programmed), copyback operation waits for the completion of programming of SLC2 prior to proceeding with the two-pass programming of a third portion C of QLC in memory device and so on. In some embodiments, a first pass of the two-pass programming is performed on QLC8 to coarsely program the QLC with data from the programmed SLCs, followed by fine programming of the programmed SLCs with data from the programmed SLCs. In some embodiments, the two-pass programming of QLC8 is delayed until SLC0-3 is programmed.

Accordingly, if a request is received from a host system (e.g., the host system 120 of FIG. 1) to perform a memory access operation (e.g., read operation) on a logical address of memory device 204 (e.g., FLA3 of FLA0-n), the FLA 3 is translated to a physical address (e.g., QLC8 PA) associated the logical address (e.g., FLA3). Based on the translated physical address (QLC8 PA), the Q2S mapping table 220 is queried to determine if the QLC8 of the memory device 204 is programmed by identifying an entry in which the index (QLC0-n) of the Q2S mapping table 220 matches the translated physical address (QLC8 PA). Once a match is identified (e.g., QLC8 of the Q2S mapping table 220), QLC8 of memory device 204 is determined to be programmed or not based on whether the bit flag of QLC8 of the Q2S mapping table 220 is set or not. Since the bit flag of QLC8 of the Q2S mapping table 220 is set, QLC8 has not been programmed. Thus a physical address of an SLC of the plurality of SLCs (e.g., SLC0-3) is identified to return to the host system instead of the QLC8 PA. As previously described, the physical address of the SLC of the plurality of SLCs to return is based on a page number of the physical address of QLC8. Thus, the memory access operation is directed to the returned physical address of the SLC of the plurality of SLCs.

Referring to FIG. 2C, once the allocated QLC (e.g., QLC8) is programmed (e.g., fully programmed or copyback operation and two-pass programming of QLC is complete), the bit flag of the Q2S mapping table associated with QLC8 is cleared. Accordingly, if a request is received from a host system (e.g., the host system 120 of FIG. 1) to perform a memory access operation (e.g., read operation) on a logical address of memory device 204 (e.g., FLA3 of FLA0-n), the FLA 3 is translated to a physical address (e.g., QLC8 PA) associated the logical address (e.g., FLA3). Based on the translated physical address (QLC8 PA), the Q2S mapping table 220 is queried to determine if the QLC8 of the memory device 204 is programmed by identifying an entry in which the index (QLC0-n) of the Q2S mapping table 220 matches the translated physical address (QLC8 PA). Once a match is identified (e.g., QLC8 of the Q2S mapping table 220), QLC8 of memory device 204 is determined to be programmed or not based on whether the bit flag of QLC8 of the Q2S mapping table 220 is set or not. Since the bit flag of QLC8 of the Q2S mapping table 220 is not set, QLC8 has been programmed. Thus, QLC8 PA is returned to the host system.

FIG. 3 is a flow diagram of an example method 300 to perform memory access operation based on the Q2S mapping table, in accordance with some embodiments of the present disclosure. Method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by the table management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic, maintains, on a volatile memory device, a quad-to-single (Q2S) data structure comprising a plurality of the Q2S mapping entries. Each Q2S mapping entry is identified by a physical address of a quad-level cell (QLC) block stripe of a non-volatile memory device and comprises a bit flag and a pointer to a linked list on the volatile memory device. As previously described, each entry of the Q2S mapping table is indexed by the QLC block stripe and stores a bit flag and a pointer to a linked list storing a physical address of each SLC block stripe associated with the QLC block stripe.

At operation 320, responsive to programming at least one single-level cell (SLC) block stripe of a plurality of SLC block stripes of the non-volatile memory device with data to be programmed to a QLC block stripe, the processing logic appends to a linked list an entry for an identification of the QLC block stripe to be programmed and an entry for each physical address of the at least one SLC block stripe of the plurality of SLC block stripes programmed with data to be programmed to the QLC block stripe. The linked list corresponds to a Q2S mapping entry associated with the QLC block stripe to be programmed. As previously described, the entry for the identification of the QLC block stripe to be programmed is a header node of the linked list. Then the linked list is further populated with a node for each sequential programming of the plurality of SLC block stripes.

In some embodiments, responsive to programming at least one SLC block stripe of a plurality of SLC block stripes of the non-volatile memory device with data to be programmed to the QLC block stripe, the processing logic sets the bit flag of the Q2S mapping entry associated with the QLC block stripe to be programmed to indicate that the QLC block stripe is not programmed. As previously described, the bit flag may be set (e.g., to the logical "1") to indicate that the QLC block stripe is not programmed (e.g., the copyback operation has not been completed or that both passes of the two-pass programming have not been completed).

In some embodiments, responsive to programming the QLC block stripe, the processing logic clears the bit flag of the Q2S mapping entry associated with the QLC block stripe to be programmed to indicate that the QLC block stripe is programmed. As previously described, the bit flag may be cleared or reset (e.g., to the logical "0") to indicate that the QLC block stripe is programmed (e.g., the copyback operation has been completed or that both passes of the two-pass programming have been completed).

In some embodiments, responsive to receiving a request to perform a memory access operation on a logical address, the processing logic translates, based on an entry of a logical-to-physical (L2P) data structure, the logical address corresponds to a physical address of a QLC block stripe. The processing logic determines whether the QLC block stripe is programmed. As previously described, to determine that the QLC block stripe is programmed, the processing logic queries the Q2S data structure for a Q2S mapping entry based on the physical address of the QLC block stripe and determines that a bit flag of the Q2S mapping entry indicates that the QLC block stripe is programmed (e.g., the bit flag is set). Responsive to determining that the QLC block stripe is programmed, the processing logic performs the memory access operation on the QLC block stripe using the physical address of the QLC block stripe.

In some embodiments, responsive to receiving a request to perform a memory access operation on a logical address, the processing logic translates, based on an entry of a logical-to-physical (L2P) data structure, the logical address corresponds to a physical address of a QLC block stripe. The processing logic determines whether the QLC block stripe is not programmed. As previously described, to determine that the QLC block stripe is not programmed, the processing logic queries the Q2S data structure for a Q2S mapping entry based on the physical address of the QLC block stripe and determines that a bit flag of the Q2S mapping entry indicates that the QLC block stripe is not programmed (e.g., the bit flag is reset or cleared).

Responsive to determining that the QLC block stripe is not programmed, the processing logic performs the memory access operation on an SLC block stripe using a physical address of the SLC block stripe. As previously described, to perform the memory access operation on the SLC block stripe, the processing logic queries the Q2S data structure for a Q2S mapping entry based on the physical address of the QLC block stripe and accesses a Q2S linked list associated with the Q2S mapping entry to determine the physical address of the SLC block stripe from a plurality of SLC block stripes of the Q2S linked list based on a page number of the physical address of the QLC block stripe. As previously described, since each Q2S mapping entry of the Q2S data structure is identified by the QLC block stripe, for example, the physical address of the QLC block stripe, the processing logic matches the physical address of the QLC block stripe associated with the memory access operation with a Q2S mapping entry of the Q2S data structure. Once a match is determined, the processing logic, as previously described, accesses the linked list associated with the Q2S mapping entry by using the pointer stored in the Q2S mapping entry. As previously described, to identify which of the SLC block stripes to return a physical address for, the processing logic identifies a page number of the physical address of the QLC block stripe associated with the memory access operation and, based on the page number of the physical address of the QLC block stripe determines which physical address of the SLCs to return to the host system.

FIG. 4 is a flow diagram of an example method 400 to perform memory access operation based on the Q2S mapping table, in accordance with some embodiments of the present disclosure. Method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by the table management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic programs at least one single-level cell (SLC) block stripe of a plurality of SLC block stripes of a non-volatile memory device with data to be programmed to a quad-level cell (QLC) block stripe of the non-volatile memory device, wherein the plurality of SLC block stripes are associated with the QLC block stripe. As previously described, each SLC (e.g., 4 SLCs that fits into a single QLC) is utilized as a cache to initially program the data to be written to the QLC in preparation for a copyback operation (e.g., reading data from the allocated SLCs and programming the data to the corresponding allocated QLC using two-pass programming).

At operation 420, the processing logic identifies an entry of a quad-to-single (Q2S) mapping table, on a volatile memory device, based on a physical address of the QLC block stripe to be programmed, wherein each entry of the Q2S mapping table comprises a pointer to a linked list on the volatile memory device and a bit flag. As previously described, each entry of the Q2S mapping table is indexed by the QLC block stripe and stores a bit flag and a pointer to a linked list storing a physical address of each SLC block stripe associated with the QLC block stripe At operation 430, the processing logic sets a bit flag of the entry of the Q2S mapping table indicating that the QLC block stripe to be programmed is not programmed. As previously described, the bit flag may be set (e.g., to the logical "1") to indicate that the QLC block stripe is not programmed (e.g., the copyback operation has not been completed or that both passes of the two-pass programming have not been completed).

At operation 440, the processing logic updates the pointer of the entry of the Q2S mapping table to point to a linked list, wherein the linked list includes a first entry comprising an identification of the QLC block stripe to be programmed and an entry for each physical address of the plurality of SLC block stripes programmed with the data to be programmed to the QLC block stripe. As previously described, the first entry for the identification of the QLC block stripe to be programmed is a header node of the linked list. Then the linked list is further populated with a node for each sequential programming of the plurality of SLC block stripes.

At operation 450, the processing logic copies the data of the plurality of programmed SLC block stripes to the QLC block stripe to be programmed. As previously described, the data of the plurality of programmed SLC block stripes are programmed to the QLC block stripe using two-pass programming.

In some embodiments, responsive to copying from the plurality of programmed SLC block stripes to the QLC block stripe to be programmed, the processing logic clears the bit flag of the entry of the Q2S mapping table associated with the QLC block stripe indicating the QLC block stripe is programmed. As previously described, the bit flag may be cleared or reset (e.g., to the logical "0") to indicate that the QLC block stripe is programmed (e.g., the copyback operation has been completed or that both passes of the two-pass programming have been completed).

In some embodiments, responsive to receiving a request to perform a memory access operation on a logical address corresponding to a physical address of a QLC block stripe, the processing logic determines, based on the Q2S mapping table, whether the QLC block stripe is programmed (e.g., the bit flag is set). Responsive to determining that the QLC block stripe is programmed, the processing logic performs the memory access operation on the QLC block stripe using the physical address of the QLC block stripe.

In some embodiments, responsive to receiving a request to perform a memory access operation on a logical address corresponding to a physical address of a QLC block stripe, the processing logic determines, based on the Q2S mapping table, whether the QLC block stripe is programmed. Responsive to determining that the QLC block stripe is not programmed (e.g., the bit flag is reset or cleared), the processing logic identifies, based on the entry of the Q2S mapping table associated with the QLC block stripe, a linked list associated with the entry of the Q2S mapping table to determine a physical address of a SLC block stripe of the plurality of SLC block stripes. As previously described, since each entry of the Q2S mapping table is identified by the QLC block stripe, for example, the physical address of the QLC block stripe, the processing logic matches the physical address of the QLC block stripe associated with the memory access operation with an entry of the Q2S mapping table. Once a match is determined, the processing logic, as previously described, accesses the linked list associated with the entry of the Q2S mapping table by using the pointer stored in the entry of the Q2S mapping table. As previously described, to identify which of the SLC block stripes to return a physical address for, the processing logic identifies a page number of the physical address of the QLC block stripe associated with the memory access operation and, based on the page number of the physical address of the QLC block stripe determines which physical address of the SLC block stripes to return to the host system.

Figure 5:
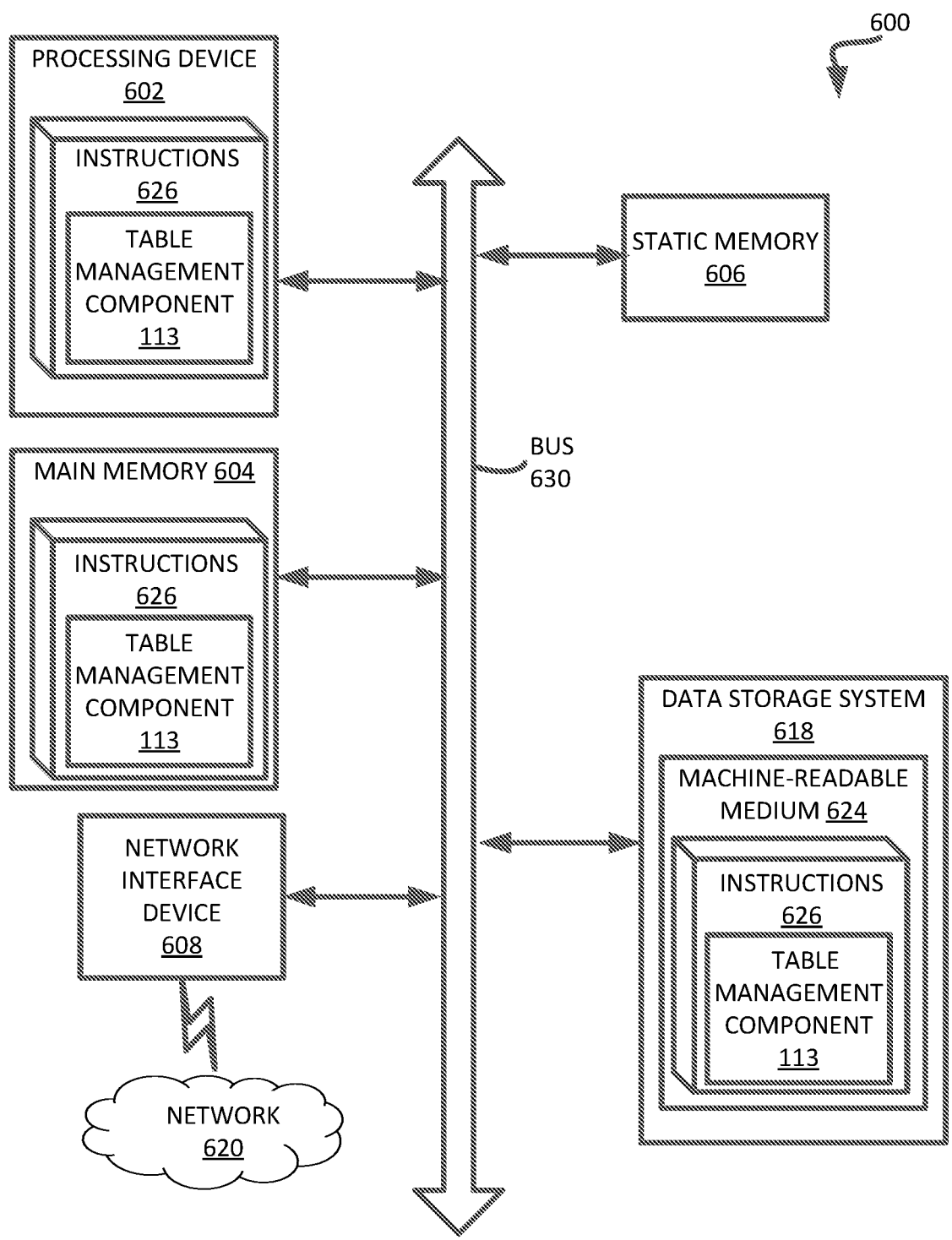
FIG. 5 is a block diagram of an example computer system in which embodiments of the present disclosure may operate.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the table management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604, and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a table management component (e.g., the table management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    maintaining, on a volatile memory device, a quad-to-single (Q2S) data structure comprising a plurality of the Q2S mapping entries, wherein each Q2S mapping entry is identified by a physical address of a corresponding quad-level cell (QLC) block stripe of a plurality of QLC block stripes of a non-volatile memory device;
    responsive to allocating a QLC block stripe, updating an entry of a logical-to-physical (L2P) data structure with the physical address of the QLC block stripe;
    responsive to allocating a plurality of single-level cell (SLC) block stripes of the non-volatile memory device for temporary storing data to be programmed to the QLC block stripe, initializing a linked list associated with an entry of the Q2S data structure referenced by the entry of the L2P data structure with the physical address of the QLC block stripe; and
    for each SLC block stripe of the plurality of SLC block stripes appending, to the linked list a physical address of a respective SLC block stripe of the plurality of SLC block stripes.

2. The method of claim 1, further comprising:
    responsive to programming the respective SLC block stripe of the plurality of SLC block stripes with a portion of the data,
    setting a corresponding bit flag reflecting a programming state of the QLC block stripe of the Q2S mapping entry associated with the QLC block stripe to indicate that the QLC block stripe is not programmed.

3. The method of claim 1, further comprising:
    responsive to programming the QLC block stripe, clearing a corresponding bit flag reflecting a programming state of the QLC block stripe of the Q2S mapping entry associated with the QLC block stripe to indicate that the QLC block stripe is programmed.

4. The method of claim 1, further comprising:
    responsive to receiving a request to perform a memory access operation on a logical address, identifying, the physical address that is mapped to the logical address by the entry of the L2P data structure, wherein the physical address references the QLC block stripe;
    determining whether the QLC block stripe is programmed; and
    responsive to determining that the QLC block stripe is programmed, performing the memory access operation on the QLC block stripe using the physical address of the QLC block stripe.

5. The method of claim 4, wherein determining whether the QLC block stripe is programmed includes querying the Q2S data structure for the Q2S mapping entry based on the physical address of the QLC block stripe and determining that a corresponding bit flag of the Q2S mapping entry indicates that the QLC block stripe is programmed.

6. The method of claim 1, further comprising:
    responsive to receiving a request to perform a memory access operation on a logical address, identifying, the physical address that is mapped to the logical address by the entry of the L2P data structure, wherein the physical address references the QLC block stripe;
    determining whether the QLC block stripe is not programmed; and
    responsive to determining that the QLC block stripe is not programmed, performing the memory access operation on an SLC block stripe using a physical address of the SLC block stripe.

7. The method of claim 6, wherein determining whether the QLC block stripe is not programmed includes querying the Q2S data structure for the Q2S mapping entry based on the physical address of the QLC block stripe and determining that a corresponding bit flag of the Q2S mapping entry indicates that the QLC block stripe is not programmed.

8. The method of claim 6, wherein performing the memory access operation on the SLC block stripe includes querying the Q2S data structure for the Q2S mapping entry based on the physical address of the QLC block stripe and accessing the linked list associated with the Q2S mapping entry to determine the physical address of the SLC block stripe from a plurality of SLC block stripes of the linked list based on a page number of the physical address of the QLC block stripe.

9. A system comprising:
    a non-volatile memory device; and
    a processing device, operatively coupled with the non-volatile memory device, to perform operations comprising:
        maintaining, on a volatile memory device, a quad-to-single (Q2S) data structure comprising a plurality of Q2S mapping entries, wherein each Q2S mapping entry is identified by a physical address of a quad-level cell (QLC) block stripe of the non-volatile memory device and comprises a corresponding bit flag reflecting programming state of the QLC block stripe and a pointer to a linked list of SLC block stripes on the volatile memory device;

responsive to allocating the QLC block stripe, updating an entry of a logical-to-physical (L2P) data structure with the physical address of the QLC block stripe;

responsive to allocating a plurality of single-level cell (SLC) block stripes of the non-volatile memory device for programming of data to be programmed to the QLC block stripe, initializing the linked list to be stored in an entry of the Q2S data structure associated with the entry of the L2P data structure with the physical address of the QLC block stripe; and for each SLC block of the plurality of SLC blocks, appending to the linked list a physical address of a respective SLC block stripe of the plurality of SLC block stripes.

10. The system of claim 9, wherein the processing device further performs operations comprising:

responsive to programming the respective SLC block stripe of the plurality of SLC block stripes with a portion of the data, setting the bit flag of the Q2S mapping entry associated with the QLC block stripe to indicate that the QLC block stripe is not programmed.

11. The system of claim 9, wherein the processing device further performs operations comprising:

responsive to programming the QLC block stripe, clearing the bit flag of the Q2S mapping entry associated with the QLC block stripe to indicate that the QLC block stripe is programmed.

12. The system of claim 9, wherein the processing device further performs operations comprising:

responsive to receiving a request to perform a memory access operation on a logical address, identifying the physical address of the QLC block stripe that is mapped to the logical address by the entry of the L2P data structure;

determining whether the QLC block stripe is programmed; and responsive to determining that the QLC block stripe is programmed, performing the memory access operation on the QLC block stripe using the physical address of the QLC block stripe.

13. The system of claim 12, wherein determining whether the QLC block stripe is programmed includes querying the Q2S data structure for the Q2S mapping entry based on the physical address of the QLC block stripe and determining that the corresponding bit flag of the Q2S mapping entry indicates that the QLC block stripe is programmed.

14. The system of claim 9, wherein the processing device further performs operations comprising:

responsive to receiving a request to perform a memory access operation on a logical address, identifying, the physical address of the QLC block stripe that is mapped to the logical address by the entry of L2P data structure;

determining whether the QLC block stripe is not programmed; and responsive to determining that the QLC block stripe is not programmed, performing the memory access operation on an SLC block stripe using a physical address of the SLC block stripe.

15. The system of claim 14, wherein determining whether the QLC block stripe is not programmed includes querying the Q2S data structure for the Q2S mapping entry based on the physical address of the QLC block stripe and determining that the corresponding bit flag of the Q2S mapping entry indicates that the QLC block stripe is not programmed.

16. The system of claim 14, wherein performing the memory access operation on the SLC block stripe includes querying the Q2S data structure for the Q2S mapping entry based on the physical address of the QLC block stripe and accessing the linked list associated with the Q2S mapping entry to determine the physical address of the SLC block stripe from the plurality of SLC block stripes of the linked list based on a page number of the physical address of the QLC block stripe.

17. A non-transitory computer-readable storage medium comprising instructions that, when executed by a processing device, cause the processing device to perform operations comprising:

responsive to allocating a quad-level cell (QLC) block stripe of a non-volatile memory device, updating an entry of a logical-to-physical (L2P) data structure with a physical address of the QLC block stripe;

responsive to allocating a plurality of single-level cell (SLC) block stripes of the non-volatile memory device for programming of data to be programmed to the QLC block stripe, initializing a linked list associated with the entry of the L2P data structure with the physical address of the QLC block stripe;

programming at least one single-level cell (SLC) block stripe of the plurality of SLC block stripes with data to be programmed to the QLC block stripe;

identifying an entry of a quad-to-single (Q2S) mapping table, on a volatile memory device, based on the entry of the L2P data structure with the physical address of the QLC block stripe, wherein each entry of the Q2S mapping table comprises a pointer to the linked list on the volatile memory device and a bit flag;

setting the bit flag of the entry of the Q2S mapping table indicating that the QLC block stripe to be programmed is not programmed;

updating the pointer of the entry of the Q2S mapping table to point to the linked list, wherein the linked list includes a first entry comprising an identification of the QLC block stripe to be programmed and an entry for each physical address of the plurality of SLC block stripes programmed with the data to be programmed to the QLC block stripe; and copying the data of the plurality of programmed SLC block stripes to the QLC block stripe to be programmed.

18. The non-transitory computer-readable storage medium of claim 17, further comprising:

responsive to copying from the plurality of programmed SLC block stripes to the QLC block stripe to be programmed, clearing the bit flag of the entry of the Q2S mapping table associated with the QLC block stripe indicating the QLC block stripe is programmed.

19. The non-transitory computer-readable storage medium of claim 17, further comprising:

responsive to receiving a request to perform a memory access operation on a logical address corresponding to the physical address of the QLC block stripe, determining, based on the Q2S mapping table, whether the QLC block stripe is programmed; and responsive to determining that the QLC block stripe is programmed, performing the memory access operation on the QLC block stripe using the physical address of the QLC block stripe.

20. The non-transitory computer-readable storage medium of claim 17, further comprising:

responsive to receiving a request to perform a memory access operation on a logical address corresponding to the physical address of the QLC block stripe, determining, based on the Q2S mapping table, whether the QLC block stripe is programmed;

responsive to determining that the QLC block stripe is not programmed, identifying, based on the entry of the Q2S mapping table associated with the QLC block stripe, the linked list associated with the entry of the Q2S mapping table to determine a physical address of a SLC block stripe of the plurality of SLC block stripes based on a page number of the physical address of the QLC block stripe; and performing the memory access operation on the SLC block stripe using the physical address of the SLC block stripe.

\* \* \* \* \*